United States Patent [19]

Leigh et al.

[11] 4,230,280
[45] Oct. 28, 1980

[54] VEHICULAR SPREADER WITH DIGITAL ELECTRONIC GROUND SPEED LINK

[75] Inventors: Theodore M. Leigh, Cedar Rapids; James L. Rawson, Atkins, both of Iowa

[73] Assignee: Highway Equipment Company, Cedar Rapids, Iowa

[21] Appl. No.: 968,376

[22] Filed: Dec. 11, 1978

[51] Int. Cl.³ .................... A01C 19/00; E01C 19/20
[52] U.S. Cl. .................................. 239/677; 239/155
[58] Field of Search ............... 222/613, 614, 626, 627; 239/62, 155, 156, 677, 670, 650; 91/375 R

[56] References Cited

U.S. PATENT DOCUMENTS

| | | | |
|---|---|---|---|
| 3,344,993 | 10/1967 | Wilder et al. | 239/156 X |
| 3,395,866 | 8/1968 | Sousek et al. | 239/670 |
| 3,441,039 | 4/1969 | Rawson | 239/155 X |
| 3,550,866 | 12/1970 | Swenson | 239/677 |
| 3,703,810 | 11/1972 | Rawson et al. | 91/375 R |
| 3,792,709 | 2/1974 | Johnson, Jr. | 239/156 X |
| 3,904,129 | 9/1975 | Lorenc | 239/650 |
| 3,929,292 | 12/1975 | Phillips | 222/627 X |
| 4,132,941 | 1/1979 | Sousek et al. | 239/155 X |

Primary Examiner—Andres Kashnikow
Attorney, Agent, or Firm—Emrich, Root, Lee, Brown and Hill

[57] ABSTRACT

In a system for spreading material from a vehicle, the ground speed of the vehicle is sensed by a low torque transducer which generates a train of electrical pulses or digital signal having a repetition rate representative of the vehicle's ground speed. The digital signal energizes a stepper motor. The shaft of the stepper motor is coupled to a mechanical comparator which is also responsive to the speed of a conveyor, which delivers the material to be spread, for controlling the conveyor drive motor so that the speed of the conveyor tracks the ground speed of the vehicle even at very low speeds. Proportioning of the ground speed signals is accomplished electronically by a digital counter circuit. Override of the ground speed control signal is actuated by the operator. The override may require continued operator actuation; or the override, once actuated may last for a predetermined time or a predetermined distance travelled by the vehicle. In the latter two cases, the time and distance may be adjusted.

11 Claims, 8 Drawing Figures

VEHICULAR SPREADER WITH DIGITAL ELECTRONIC GROUND SPEED LINK

BACKGROUND AND SUMMARY

The present invention relates to control systems for vehicular spreaders; and more particularly, it relates to a control system for a spreader of the type used in dispensing material from a moving vehicle in which the amount of material being spread is coordinated with the speed of the vehicle. That is to say, it is desirable that the amount of material spread over a given area be controlled according to the speed of the vehicle to yield a constant coverage per unit area, while allowing the vehicle speed to change over a considerable range.

Systems of this type are used to spread sand or other abrasive materials or ice control chemicals on highways, airport runways and the like, or to distribute agricultural chemicals such as fertilizers or agricultural limestone in dry or liquid form.

In such systems, a large hopper is mounted on a truck, and equipped with a conveyor or other delivery means which carries material from the hopper and delivers it to a discharge aperture, and feeds the material to one or more spinners at the rear of the vehicle. Alternatively, for the spreading of liquid material, the liquid may be stored in a tank and a variable speed pump used to supply the material under pressure to a plurality of nozzles mounted on the rear of the vehicle. The ground speed of the vehicle is sensed and a signal, either electrical, mechanical, or hydraulic, which is representative of the ground speed is generated and used to actuate a control valve associated with a variable speed hydraulic motor which drives the delivery means. As the vehicle speeds up, the speed of the conveyor motor is increased, and vice versa. Early systems of this type were "open loop" systems; and by this it is meant that the control valve was actuated directly by the ground speed signal. Other systems also sense the speed of the conveyor, and use an error signal representative of the difference between the speed of the vehicle and the speed of the conveyor to actuate the control valve. These are referred to as "closed loop" or feedback systems. Systems of this type may be further characterized as hydro-electronic control systems or hydro-mechanical control systems. A hydro-electronic control systems is disclosed in the Wilder, et al U.S. Pat. No. 3,344,993, issued Oct. 3, 1967.

One embodiment disclosed in this patent includes an electronic control unit which compares a first electrical analog signal representative of vehicular ground speed and a second electrical analog signal representative of the speed of the conveyor motor. An error signal is used to modulate a control valve to adjust the speed of the conveyor motor to bring two compared analog signals into equilibrium. These systems have the disadvantages of high initial cost, the difficulty in accurately comparing analog signals, a tendency to "hunt" which results in irregular material distribution, and a low speed threshold which is unacceptably high. For example, a low speed threshold of about three miles per hour is not suitable for some highway and agricultural purposes, and it must be considered that these systems have a broad range of application, particularly in the variations of useful speed of the vehicle. Further, commercially available electronic feedback systems which are all electronic are subject to high maintenance costs caused primarily by the hostile environment in which the systems normally operate. That is to say, in the case of an agricultural spreader, the corrosive effects of a fertilizer on the electronic transducer used to sense ground speed may cause an unacceptably high rate of failure. Salt and ice control chemicals have a similar corrosive effect.

A hydro-mechanical feedback control spreader system is disclosed in the co-owned Rawson U.S. Pat. No. 3,441,039, issued Apr. 29, 1969. In this system, ground speed is sensed by means of a friction drive wheel which is in contact with the ground or with a wheel of the vehicle, for example. Conveyor speed is sensed by direct drive from the conveyor motor or its gear train. The two rotational signals are compared in a mechanical comparator such as a rotating screw and nut, as disclosed in the patent, in which equal speeds of rotation will maintain the nut in a fixed axial position on the screw; whereas if one rotational speed varies from the other, the nut will migrate along the axis of the screw, and this displacement is used to control the speed of the conveyor motor accordingly. In systems of this type, the main disadvantages are the low torque capability of speedometer drives (which provides the energy for driving either the nut or the screws), the complexity of transferring a ground speed rotational signal without error to the mechanical comparator, and the difficulties of installation. Such systems have been found capable of operating in hostile environments with relatively low maintenance requirements, however.

A more recent improvement in a closed loop hydro-mechanical spreader control system is disclosed in the co-owned U.S. Pat. No. 3,904,129, issued Sept. 9, 1975. This system uses a mechanical comparator in the form of a differential control valve using a rotary spool for flow control to the hydraulic motor.

The present invention is an improvement in the hydro-mechanical closed loop spreader control system of the type just mentioned. Specifically, an electronic link is incorporated for generating a train of pulses from a low-torque transducer wherein the repetition rate of the pulses is representative of vehicular ground speed. The ground speed transducer may be an optical shaft encoder employing a rotary disc driven by the speedometer shaft and interrupting a photo coupler to generate the pulses. As the speed of the vehicle increases, the repetition rate of the pulses generated by the transducer also increases.

The output pulses from the transducer, after amplification, energize a stepper motor which, in turn, drives an input to the mechanical comparator. The other input to the mechanical comparator is derived from the motor which drives the conveyor. If it is desired to proportion the pulses from the transducer, the output of the amplifier may be fed to a counter circuit for dividing the repetition rate of the pulses. Thus, the transducer or rotary shaft encoder, amplifier, counter circuit, if any, and stepper motor comprise an electronic digital link in the feedback control system. The stepper motor achieves synchronization between the digital ground speed signal and the input to the mechanical comparator over the full range of speeds encountered, and particularly, from a speed slightly above zero miles per hour to any practicable maximum speed. In brief, the use of a digital electronic link in the feedback control system extends the response range of the system and increases its accuracy, particularly at lower speeds.

The capability of proportioning output pulses through the use of a counter will accommodate the present system for all types of material to be spread. That is, it will permit the conveyor to be run at a maximum output for a low ground speed for high volume distribution, such as at 7½ miles per hour as is sometimes the case in spreading limestone at rates of several tons per acre or at lower volume distributions at intermediate speeds, such as in the spreading of fertilizer at rates of a few hundred to a thousand pounds per acre and at speeds up to thirty miles per hour. It will also be useful for low volume distribution at highway speeds, for example, the spreading of a few hundred pounds of sand or salt per mile for ice control at speeds up to 45 miles per hour. It is normally the case that the conveyor is run at maximum delivery speed when the vehicle is at the maximum speed for its range, and the use of a counter in the digital electronic link facilitates achieving maximum conveyor speed at the maximum vehicle speed.

The use of an electronic digital link permits the use of electrical wires with the corresponding ease of installation from the operator's station to the mechanical comparator without requiring substantial modification of the structure of the vehicle.

Modifications of the system are disclosed including an override circuit in the digital electronic link, including a selector switch actuated by the operator which will generate a train of digital signals causing the stepper motor to run at maximum speed irrespective of the actual ground speed of the vehicle. This is useful in the spreading of ice control materials where heavy distribution is desired, such as at intersections or over bridges. The override circuit may include an oscillator for generating a train of pulses having a repetition rate corresponding to the maximum speed of the stepper motor. It may also be provided with a time cut-off so that the heavy material distribution will occur only for a specific time after the override switch is actuated. The cut-off time may be adjustable. In another embodiment, the override cut-off is controlled by vehicle displacement such that once the override is actuated, it will continue until the vehicle has travelled a predetermined distance. In this case, the cut-off may also be adjustable.

Two features of digital transducers, such as the one disclosed herein, are that the rate of digital pulses generated is independent of the direction of travel of the vehicle so that the same system may be used for spreading in the reverse direction, and the amplitude of the measuring signal is independent of the speed of the vehicle. The first is useful in applications where it is desired to spread the material in limited access areas; and the second overcomes a problem in the prior art analog system mentioned.

Other features and advantages of the present invention will be apparent to persons skilled in the art from the following detailed description of preferred embodiments accompanied by the attached drawing wherein identical reference numerals will refer to like parts in the various views.

THE DRAWING

Figure 1:
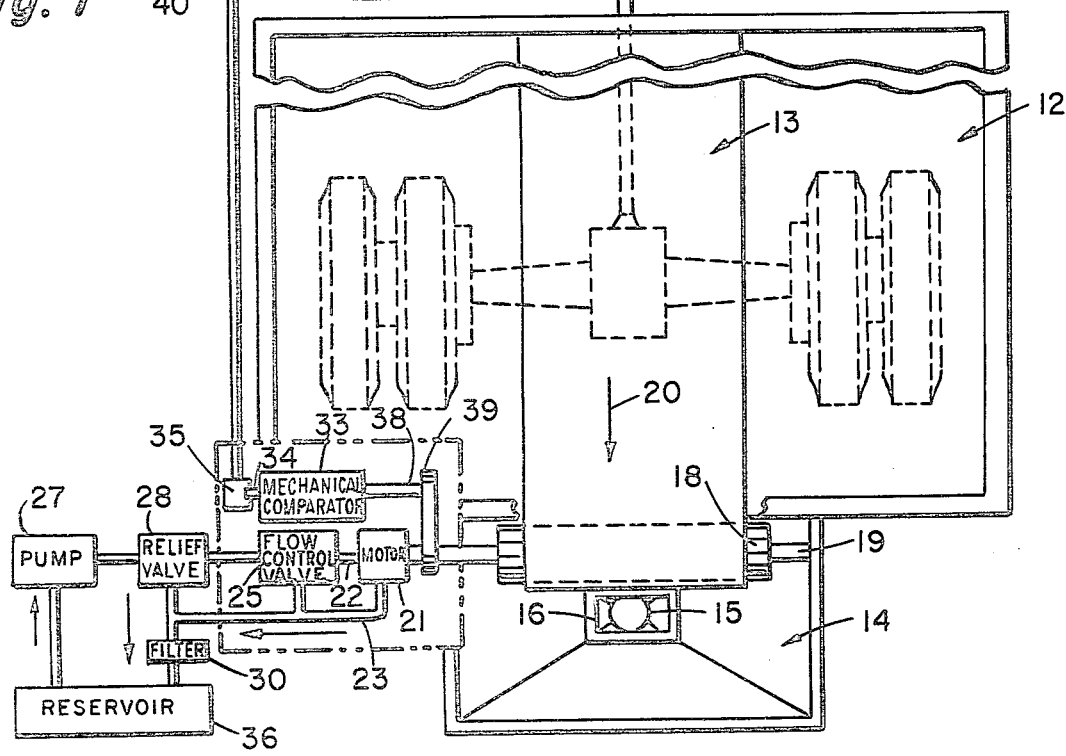
FIG. 1 is a diagrammatic plan view of a vehicular spreader equipped with a feedback control system incorporating the present invention, wherein the elements of the control system are shown in functional block form.
Figure 7:
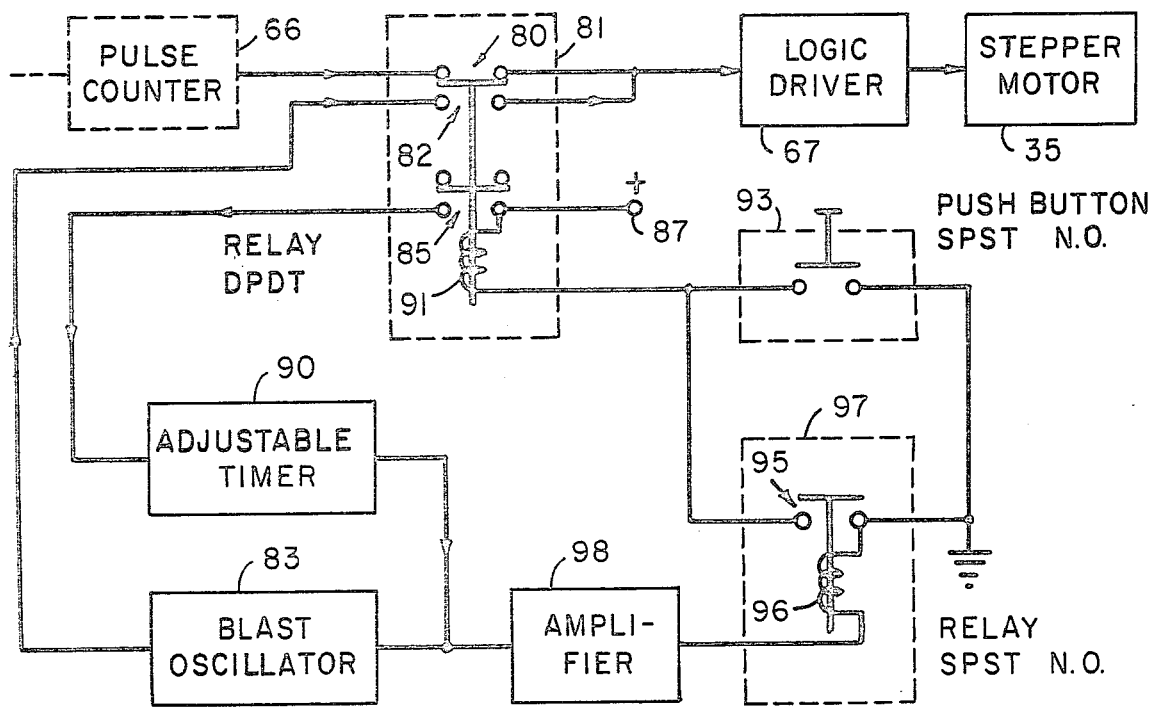
Figure 8:
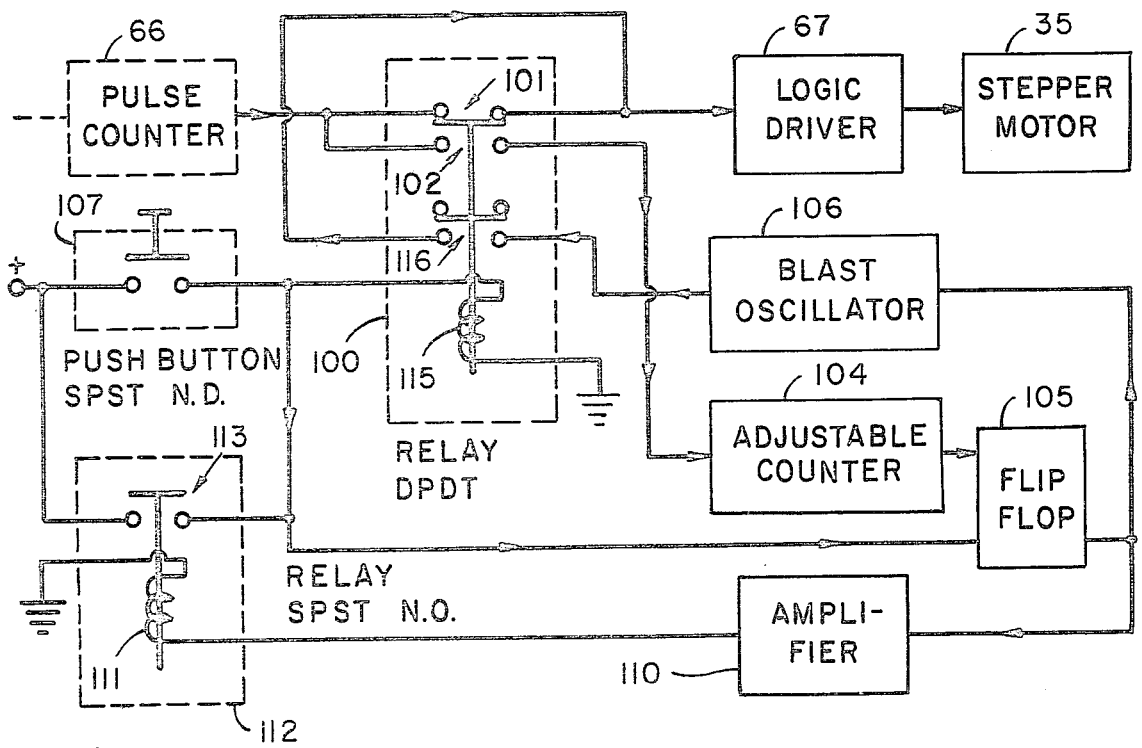

FIG. 7 is a block diagram of an electronic link for the system of FIG. 1 incorporating an operator override spreading feature independent of vehicle speed for a predetermined time; and FIG. 8 is a block diagram showing a modification of the digital electronic link for the system of FIG. 1 incorporating an override spreading feature independent of vehicle speed for a predetermined distance of vehicle travel.

DETAILED DESCRIPTION

Turning now to FIG. 1, reference numeral 10 generally designates a vehicular spreader including a feedback control system incorporating the present invention. The vehicle has an operator's cab 11 and a main or storage hopper generally designated 12. The material to be spread, in the case of particulate matter, is stored in the hopper 12 which is provided with a conveyor 13 at its lower central discharge funnel generally designated 14. A finned disc 15 is located beneath a discharge aperture 16 in the funnel 14 for spreading material floated through the aperture 16 behind the vehicle. The spinner 15 is independently driven at constant speed by a conventional hydraulic motor as is known in the art.

The conveyor 13 is driven at its discharge end by means of a roller 18 and shaft 19 in the direction of the arrow 20. The shaft 19 is coupled to a hydraulic motor 21 having an input 22 and a drain conduit 23. A flow control valve 25 is connected between a hydraulic pump 27 and the input of the motor 22. A relief valve 28 is interposed between the pump and the flow control valve. The drains of the relief valve 28, flow control valve 25 and motor 21 are all connected through a filter 30 to a hydraulic reservoir 36, from which the pump 27 draws fluid.

The flow control valve 25 is actuated by a mechanical comparator 33 which compares the angular velocity between a first input shaft 34 from a stepper motor 35, and a second input shaft 38 coupled by means of a cogged belt 39 to the shaft 19 driven by the hydraulic motor 21. Thus, the angular velocity of the shaft 38 is representative of conveyor speed, and the angular velocity of the shaft 34 is representative of the speed of the stepper motor 35. If the speed of the conveyor is less than the speed of the stepper motor, the flow control valve 25 will be actuated to increase flow between the pump 27 and motor 21, thereby to increase the speed of the delivery system. Conversely, if the speed of the conveyor is greater than the speed of the motor, the flow control valve 25 will be actuated to reduce the speed of the hydraulic motor 21. In this manner, an error signal is developed by the mechanical comparator to control the speed of the delivery means to track the speed of the stepper motor.

The stepper motor is fed by means of a digital signal along a cable or wires 40 from pulse counter and motor drive circuits 41. A signal is derived from a vehicle's transmission 43 by a speedometer drive 44 which actuates a flexible shaft 46 of conventional design. A pulse generator or transducer 48 is responsive to that angular velocity of the shaft 46 of the speedometer cable for generating a train of electrical pulses to the pulse counter 41, the repetition rate of the digital pulses in the train being representative of the speed of the vehicle. The circuitry is actuated by the battery 50 of the vehicle.

Figures 4, 5:
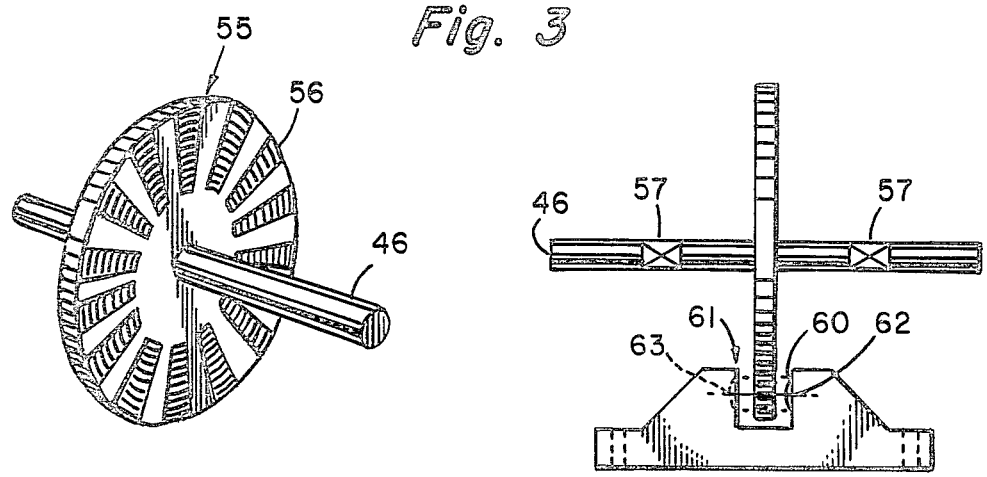
FIG. 4 is a perspective view of a light-interrupting disc used in the transducer of FIG. 1 for sensing ground speed.
FIG. 5 is a diagrammatic side view of the disc of FIG. 4 used in conjunction with a photo-coupler.

Turning now to FIGS. 4 and 5, the low torque mechanical/electrical transducer for producing the train of digital pulses representative of the speed of the vehicle includes a transparent disc generally designated 55, which is mounted to the shaft 46 of the speedometer cable which, in turn, is driven by the speedometer drive 44 of FIG. 1. The disc 55 includes a plurality of radial sectors, equally angularly spaced about the disc, and designated 56. These sectors may be of metal, paint or other opaque material so as to prevent the transmission of light through the disc.

Turning now to FIG. 5, the disc 55 is mounted by means of a pair of bearings diagrammatically shown at 57 so that the periphery of the disc and the opaque sectors 56 intersect a light beam diagrammatically illustrated by the dashed line 60 provided by a photo-couple generally designated 61 and including a light source 62 (which may be a Light-Emitting Diode), and a photo sensitive element 63 (which may be a photo transistor). Such elements are commercially available in matched pairs, and normally even include a pulse shaping circuit such as a schmitt trigger circuit. All of these circuits are included within the block labeled "pulse generator" and designated 48 in FIGS. 1 and 3. The output of the pulse generator 48 may be directly coupled to a drive circuit including an amplifier and a four-phase logic element which sequences the pulses, amplifies them, and energizes the stepper motor 35. A commercially available driver/sequencer is the series SAA1027 Stepper Motor IC DRIVER, available through North American Philips Controls Corporation, Cheshire, Connecticut, 06410. Stepper motors are also commercially available, one being the series 82900 stepper motor, also available from North American Philips Controls Corporation. This is a four-phase stepper motor, and the drive circuit 41 receives the incoming pulses and distributes them to the proper phase winding on the motor to energize the motor for rotation in the proper direction. The stepper motor includes a softiron, multipole rotor and a multiphase wound stator. As alternate phases are successively energized, the salient rotor poles are sequentially aligned with corresponding stator poles, moving precise angular increments with each input pulse. Such a combination provides very high resolution over a broad frequency spectrum, down to DC.

Where it is desired to build into the system a capability of achieving maximum conveyor speed at different vehicle ground speeds (so that, for example, the same system may be used as a fertilizer spreader where maximum conveyor speed would be required at a vehicle ground speed of thirty miles per hour as well as a limestone spreader where maximum conveyor speed would be required at a vehicle ground speed of approximately seven and a half miles per hour), a counter circuit may be used to count down or divide the repetition rate of the pulses. This obviates the need for any mechanical gearing.

Figure 3:
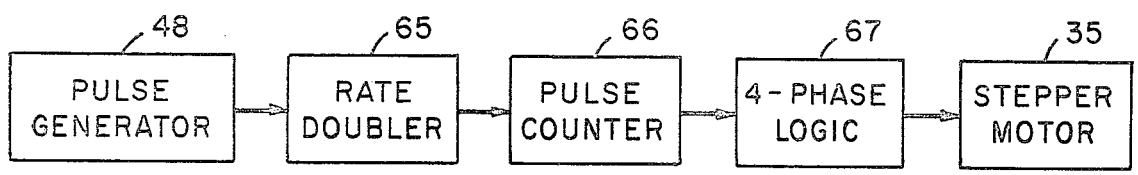
FIG. 3 is a functional block diagram of a modification of the electronic digital link of the system of FIG. 1 including a rate doubler circuit.

In one such system, as seen in FIG. 3, the output of the pulse generator 48 is coupled to the input of a rate doubler 65 which includes circuits responsive to the positive-going edge and the negative-going edge of the output pulses from the pulse generator 48 and thereby double its repetition rate.

The output of the rate doubler 65 is fed to the input of the pulse counter 66; and a selected output of the pulse counter (representative of a predetermined division of the repetition rate of the incoming frequency) is coupled to the input of the four-phase logic circuit shown functionally as the block 67. The output of the logic circuit 67 or sequencer is fed to the input of the stepper motor 35 shown in FIG. 3 in functional block form.

Figure 2:
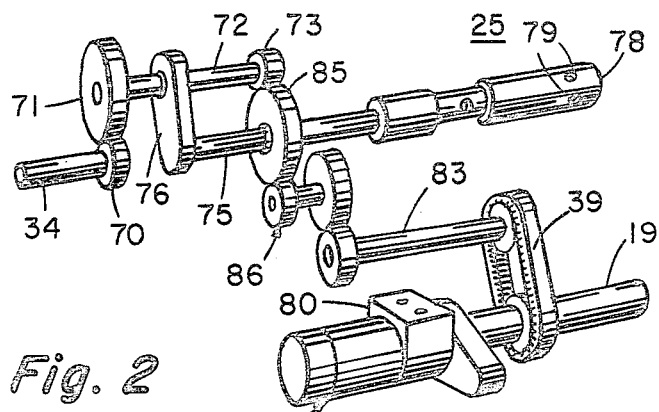
FIG. 2 is a perspective view of the mechanical comparator system including a rotary valve spool responsive to conveyor speed and vehicle speed for controlling the speed of the conveyor motor.

Turning now to FIG. 2 which illustrates the mechanical comparator 33, the output shaft of the stepper motor 35 is again designated 34 which is provided with a small spur gear or pinion 70. The pinion 70 engages a larger spur gear 71 which is secured to one end of a shaft 72, the other end of which is provided with a control pinion 73. Whereas the shaft 34 is mounted to rotate about a fixed axis, the shaft 72 is permitted to rotate about its own axis and to have its axis orbit about the axis of the shaft 34, the latter shaft being aligned with a third shaft 75 having one end connected to an idler arm 76 and the other end connected to a spool 78 of the flow control valve 25. The spool 78 is provided with a series of circumferentially spaced apertures 79 which permit the communication of hydraulic fluid when aligned with corresponding apertures on a housing, as further disclosed in U.S. Pat. No. 3,703,810; and it is in this manner, that the position of the shaft 75 determines the flow of fluid to the hydraulic motor 21. The housing for the control valve in which the spool 78 is mounted is, in turn, mounted to a housing 80 on the motor 21.

Figure 6:
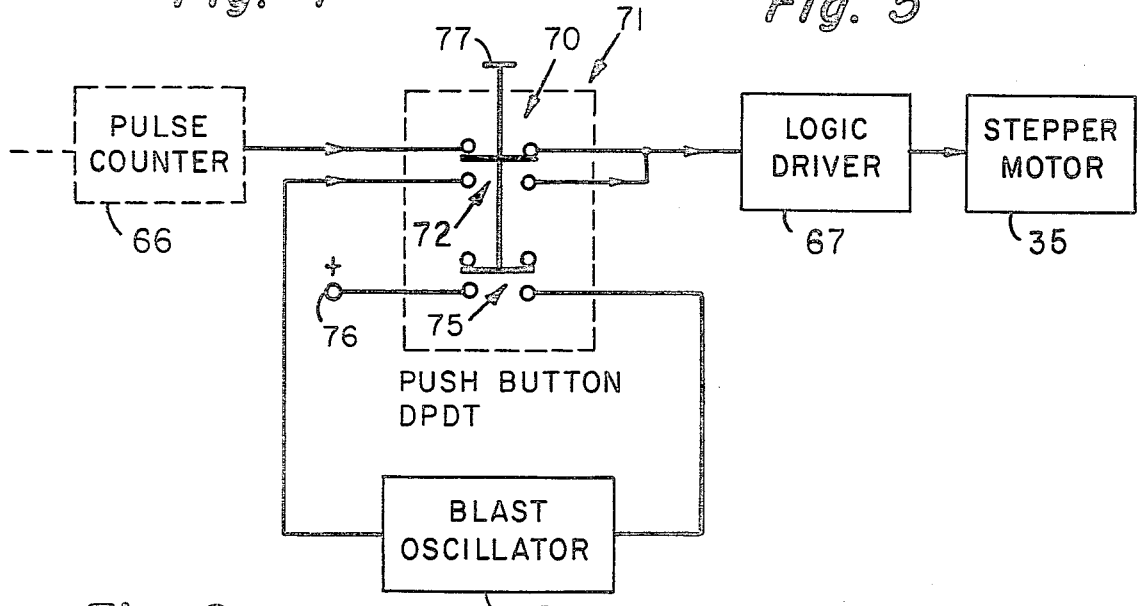
FIG. 6 is a block diagram of an electronic link for the system of FIG. 1 including an operator override feature requiring continued operator actuation.

The output shaft of the motor 21 is again designated 19, and a feedback signal is derived by means of the cogged belt 39 which drives a slave shaft 83. The slave shaft 83, in turn, is connected to drive a resolving gear 85 by means of an intermediate train generally designated 86. The resolving gear 85 is rotatably mounted on the shaft 75 which is connected to the idler arm 76. Briefly, if the angular velocity of the slave shaft 83 (which is representative of the speed of the conveyor or delivery means) is greater than the angular velocity of the shaft 34 of the stepper motor (which may be proportioned, of course, by any constant according to the gearing involved), then the resolving gear 85 will cause the shaft 72 to orbit in one direction about the shaft 75; and the idler arm 76 will crank the valve so that the spool 78 will reduce the flow of fluid to the hydraulic motor 21. If, on the other hand, the angular velocity of the slave shaft 83 is less than that of the shaft 34 of the stepper motor, the shaft 72 will orbit in the opposite direction, causing the spool 78 to permit a greater flow of hydraulic fluid to the motor 21. Excess fluid is, of course, returned to the reservoir 31 by means of the conduit 23 in FIG. 1.

Where it is desired to provide an operator override option so that the conveyor can be run at a predetermined speed (usually the maximum speed) either while the vehicle is standing still or while it is traveling, the sub-system of FIG. 6 may be employed. Such a feature may be desirable, for example, in emptying unused contents of the storage hopper after use, in checking conveyor functioning, or in providing for heavy spreading at a specific location (called "blast operation"). Such a feature may be useful for spreading ice control materials on intersections or over bridges. In FIG. 6, those functional elements already described in connection with FIG. 3 are reproduced with like reference numerals. The output of counter 66 is connected through one set of normally closed contacts generally designated 70 of a manually operable switch 71 to the four-phase logic driver circuit 67, previously described. A second set of normally open contacts 72 couples the output of a blast oscillator 73 to the input of the logic driver 67 when the switch 71 is actuated; and a set of normally open contacts 75 connects a power supply terminal 76 to supply power for blast oscillator 73.

The switch 71 is of the momentary contact type—that is, it is biased to the position shown in the drawing, and requires continued operator action for actuation. When the operator depresses a push button, diagrammatically illustrated at 77, the contacts 70 disconnect the output of the pulse counter 66; and the contacts 75 energize the blast oscillator 73, while the contacts 72 couple the output signal from the blast oscillator to the logic driver 67, thereby affording a manual override which continuously actuates the stepper motor 35 for so long as the operator continues to hold the push button 77 down.

The function of the embodiment of FIG. 7 is to actuate the stepper motor 35 at a predetermined speed for a predetermined, but adjustable time. The output of the pulse counter 66 is connected to a first set of normally closed contacts 80 of a relay 81. A second set of normally open contacts 82 couple the output of a blast oscillator 83 to the input of the logic driver circuit 67 when the relay 81 is energized. A third set of normally open contacts 85 connects the positive supply terminal 87 (which may be the vehicle battery) to the input of an adjustable timer 90. The timer 90 as well as the oscillator 83 may be any one of a number of commercially available circuits for performing the desired function. Either solid state or mechanical timers are available, and the oscillator 83 is merely set to oscillate at a fixed frequency but to provide sufficient output power to drive the logic driver 67.

A coil 91 of the relay 81 has one terminal connected to the positive supply and a second terminal connected to an operator push button switch 93, the other terminal of which is grounded. The junction between the coil 91 and switch 93 is also connected through a set of normally open contacts 95 to ground. The contacts 95 are actuated by a coil 96 of a relay 97. The coil 96 is energized by an amplifier 98 which, in turn, receives the output from the timer 90.

The embodiment of FIG. 7 works as follows. When the operator pushes the switch 93, its contacts close, thereby energizing the coil 91 of relay 81. The normally open contacts 85 of the relay 81 couple the power source to energize the timer 90; and the output of the timer 90 is a signal lasting for a predetermined time, but the duration is adjustable. This signal is coupled through the amplifier 98 to energize the coil 96, and thereby close contacts 95 for the duration of the timer period. The relay 97 therefore acts as a holding relay for the coil of relay 81. When the relay 81 is energized, in addition to closing the contacts 85, the contacts 80 are also actuated, thereby disconnecting the input of the logic driver 67 from the pulse counter 66, and connecting it to the output of blast oscillator 83. Thus, the logic driver 67 is fed a signal having a predetermined repetition rate to drive the stepper motor at a fixed speed and for a predetermined time as determined by the adjusted timer 90. When the output of the timer 90 returns to 0, the relay 97 will be de-energized, thereby opening the contacts 95 and de-energizing the coil 91 of relay 81. This system will return to its original state in which the pulse counter 66 is connected to the logic driver 67. The switch 93, being a momentary contact switch, will have returned to its open state.

The embodiment of FIG. 8 actuates the stepper motor 35 for a predetermined, adjustable distance of vehicle travel. Such a system might be used, for example, for salting intersections. It has the advantage that an operator may simply push a button and return his attention to driving the vehicle.

A relay 100 has a first set of normally closed contacts 101 which connect the output of the pulse counter 66 to the input of the logic driver 67. A second set of normally open contacts 102 are connected between the output of the pulse counter and the input of an adjustable counter 104, the output of which is connected to a flip-flop 105. The counter 104 counts pulses from the counter 66, and when a predetermined number of pulses are counted in the counter 104, the flip-flop 105 changes state. Prior to counting this predetermined number, the flip-flop 105 will have enabled a blast oscillator 106 as will be described presently. A momentary contact push button switch 107 is connected between the power supply and the input of the flip-flop 105. When an operator depresses the switch 107, the flip-flop 105 will be set to enable the blast oscillator 106; and as just indicated, the blast oscillator will be disabled when the flip-flop 105 is reset as the adjustable counter 104 reaches its predetermined count. Since the switch 107 is a momentary contact switch, the output of the flip-flop is coupled through an amplifier 110 to a coil 111 of a relay 112 having a set of normally open contacts 113 for insuring that the flip-flop 105 remains set, although flip-flops are available which will remain in a set condition until reset. At the same time, however, the closing of the switch 107 energizes a coil 115 of the relay 100 to commence operation. The relay 100 also includes a set of normally open contacts 116 connected between the output of the oscillator 106 and the input of the logic driver 67.

In operation, when the push button 107 is depressed, the flip-flop 105 is enabled to commence operation of the blast oscillator 106. The coil 115 of relay 100 is energized, and the output of the blast oscillator is coupled through the contacts 116 to the input of the logic driver 67 to actuate the stepper motor 35. At this time the output of the pulse counter 66 is disconnected from the logic driver and fed to the adjustable counter 104. When the contents of the adjustable counter reaches a predetermined number which is representative of the vehicle's having traveled a predetermined distance, the output of the counter 104 resets the flip-flop 105 to disable the blast oscillator 106. When the flip-flop is reset, it also disables the relay 112, which, in turn, disables the relay 100.

Further, although the embodiments of FIGS. 6–8 include relays, these subsystems may readily be implemented in solid state circuitry using any one of a number of existing technologies, such as large scale integrated (LSI) circuits or others, as persons skilled in the art will appreciate.

The blast oscillator of FIGS. 6, 7 and 8 may be a conventional pulse generator providing a square wave output having a frequency corresponding to the predetermined delivery rate of the conveyor (about 200–250 pulses per second for a maximum delivery rate).

It will thus be appreciated that the present invention provides a digital electronic link for generating an input signal to the mechanical comparator 33, which signal comprises a train of pulses having a repetition rate representative of the speed of the vehicle and which will be tracked by the conveyor or other delivery means for delivering material to be spread by the spinner disc 15 or other equivalent distribution means. In addition to the advantages indicated above, it will be appreciated from a consideration of FIG. 1 that all of the logic elements of the electronic digital link are located in the vehicle cab and that only higher level of power voltages and currents are transmitted from the vehicle cab to the stepper motor 35 along the cable 40. In these power signals, noise is not a problem; whereas, if logic level signals were transmitted along this length of cable, noise might have to be accounted for.

Having thus disclosed in detail preferred embodiments of the invention, persons skilled in the art will be able to modify certain of the structure which has been disclosed and to substitute equivalent elements for those described while continuing to practice the principle of the invention; and it is, therefore, intended that all such modifications and substitutions be covered as they are embraced within the spirit and scope of the appended claims.

We claim:

1. In a control system for a vehicular spreader having a source of material to be spread, distribution means, delivery means for delivering material from said source to said distribution means and power means for actuating said delivery means, the improvement comprising: low-torque transducer means sensing the ground speed of said vehicle for generating a train of electrical pulses having a repetition rate representative of the ground speed of said vehicle; stepper motor means actuated by said train of electrical pulses; comparator means responsive to the angular velocity of said stepper motor means and said power means for generating an error signal representative of the difference between the speed of said delivery means and the speed of said vehicle; and control means responsive to said error signal for controlling the speed of said power means to track the speed of said vehicle.

2. The apparatus of claim 1 wherein said material is particulate matter and wherein said delivery means includes a conveyor, said power means comprising a stepper motor means for actuating said conveyor to deliver said particulate matter, said distribution means including a spinner disc receiving material from said conveyor means, and wherein said stepper motor means is responsive to said train of pulses for incrementally rotating a shaft in response thereto, said comparator means being responsive to the angular velocity of said shaft of said stepper motor and to the angular velocity of said motor of said power means for generating said error signal.

3. The apparatus of claim 2 wherein said low torque transducer means comprises a disc; means sensing vehicle speed for driving said disc in an angular velocity representative of the velocity of said vehicle; and photo couple circuit means responsive to the rotation of said disc for generating a pulse for a predetermined increment of angular displacement of said disc.

4. The apparatus of claim 3 wherein said disc is transparent and includes a plurality of equally angularly spaced opaque sectors and wherein said said photo couple means includes a source of light adapted to transmit a light beam through said disc to be interrupted by said opaque sectors when said disc is turned; and light-sensitive semi-conductor means responsive to the transmission of said light beam through said disc.

5. The apparatus of claim 4 further comprising oscillator circuit means for generating an output signal having a predetermined repetition rate; an operator-actuated switch means for decoupling the output of said transducer means from said stepper motor means and for actuating said oscillator circuit means and for coupling the output of said oscillator circuit means to drive said stepper motor means, whereby said delivery means may be operated independent of the speed of said vehicle for so long as the operator actuates said switch means.

6. The apparatus of claim 4 further comprising timer circuit means for generating an output signal for a predetermined time; oscillator circuit means for generating an output signal having a predetermined repetition rate; an operator-actuated switch means for decoupling the output of said transducer means from said stepper motor means and for actuating said timer circuit means to enable said oscillator circuit means, the output of said oscillator circuit means being coupled to actuate said stepper motor means at a predetermined repetition rate for the length of time determined by said timer circuit means, whereby said delivery means may be operated at a predetermined speed irrespective of the speed of said vehicle for a predetermined time.

7. The apparatus of claim 4 further comprising oscillator circuit means for generating a signal at a predetermined repetition rate; operator switch means actuatable by an operator; counter circuit means, said switch means being operative when actuated to couple the output of said transducer means to said counter circuit means and to actuate said oscillator circuit means, the output of said oscillator circuit means being coupled to said digital motor means, said counter circuit means being responsive to a predetermined number of pulses from said transducer means to deactuate said oscillator circuit means, whereby the operator may actuate said switch means to cause said delivery means to be operated at a predetermined speed for a predetermined travel distance of said vehicle.

8. The apparatus of claim 1 further comprising counter circuit means responsive to the output of said transducer means for dividing the repetition rate of said train of pulses by a predetermined amount; said stepper motor means being driven by the output of said counter circuit means, the output of said stepper motor means being coupled to said comparator means.

9. In a control system for a vehicular spreader including a source of material to be spread, distribution means for spreading said material; power means for actuating said distribution means; and delivery means for delivering material from said source to said distribution means, the improvement comprising: digital transducer means responsive to the ground speed of said vehicle for generating a train of electrical pulses having a repetition rate representative of the speed of said vehicle; digital motor means adjacent the rear end of said vehicle and responsive to said train of pulses for incrementally rotating an output shaft, said power means being responsive to the output shaft of said digital motor means for controlling the speed of said delivery means; counter circuit means located in the cab of said vehicle and responsive to the output pulses from said transducer means for dividing said repetition rate by a predetermined amount; said transducer means comprising a disc having alternate opaque and transparent sectors; means for rotating said disc at an angular velocity representative of the speed of said vehicle; photo couple means associated with said disc for generating pulses as said alternate opaque and transparent sectors of said disc pass a predetermined location; logic and drive circuit means in said cab responsive to the output of said counter circuit means for generating digital power signals to control the rotational movement of said motor means; and conductor means coupling the power signals from said logic and drive circuit means in said cab to said motor means, whereby said conductor means carries digital power signals having relative immunity to noise.

10. The apparatus of claim 9 further comprising switch means actuatable by an operator; oscillator circuit means for generating a signal having a predetermined fixed repetition rate; and timer circuit means responsive to the actuation of said switch means for energizing said oscillator means for a predetermined time, the output of said oscillator circuit means being coupled by said switch means to said digital motor means, whereby said digital motor means is driven at a predetermined, constant repetition rate for a predetermined time.

11. In a control system for a vehicular spreader including a source of material to be spread, distribution means for spreading said material; power means for actuating said distribution means; and delivery means for delivering material from said source to said distribution means, the improvement comprising: digital transducer means responsive to the ground speed of said vehicle for generating a train of electrical pulses having a repetition rate representative of the speed of said vehicle; digital motor means responsive to said train of pulses for incrementally rotating an output shaft, said power means being responsive to the output shaft of said digital motor means for controlling the speed of said delivery means; switch means actuatable by an operator; counter circuit means; and oscillator circuit means generating an output signal of predetermined repetition rate, said switch means being operative, when actuated, to couple the output of said oscillator circuit means to said digital motor drive means, said counter circuit means being responsive to the output signals of said transducer means for resetting said oscillator circuit means to deactuate said motor means when a predetermined number of digital pulses has been counted by said counter circuit means.

* * * * *